US006904238B2

(12) United States Patent
Beal et al.

(10) Patent No.: US 6,904,238 B2
(45) Date of Patent: Jun. 7, 2005

(54) SYSTEM AND METHOD FOR MEASURING POLARIZATION DEPENDENT GAIN OF AN OPTICAL AMPLIFIER

(75) Inventors: David A. Beal, Loveland, CO (US); Patricia S Miller, Berthoud, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 415 days.

(21) Appl. No.: 10/267,409

(22) Filed: Oct. 9, 2002

(65) Prior Publication Data
US 2004/0070749 A1 Apr. 15, 2004

(51) Int. Cl.[7] .......................... H04B 17/00; H04B 10/08
(52) U.S. Cl. ........................................... 398/37; 398/16
(58) Field of Search ..................................... 398/37, 16

(56) References Cited

U.S. PATENT DOCUMENTS

| | | | | |
|---|---|---|---|---|
| 5,345,331 A | * | 9/1994 | Bergano et al. | 359/341.31 |
| 5,841,557 A | * | 11/1998 | Otsuka et al. | 398/65 |
| 6,576,886 B1 | * | 6/2003 | Yao | 250/225 |
| 6,611,369 B2 | * | 8/2003 | Matsushita et al. | 359/334 |
| 2001/0055133 A1 | * | 12/2001 | Yamaguchi et al. | 359/110 |
| 2003/0039005 A1 | * | 2/2003 | Roberts et al. | 359/122 |

OTHER PUBLICATIONS

Heismann, Fred. Compact Electro–Optic Polarization Scramblers for Optically Amplfied Lightwave Systems. Journal of Lightwave Technology. vol. 14. No. 8. Aug. 1996. pp. 1801–1814.*

Bruyere et al. Demonstration of an Optimal Polarization Scrambler for Long–Haul Optical Amplifier Systems. IEEE Photonics Technology Letters. vol. 6. No. 9. Sep. 1994. pp. 1153–1155.*

* cited by examiner

*Primary Examiner*—Thomas H. Tarcza
*Assistant Examiner*—Deandra M. Hughes

(57) ABSTRACT

A system and method that effectively measures the polarization dependent gain of an optical amplifier without significantly introducing error into that measurement is provided. A saturating optical signal source generates an optical signal capable of saturating the optical amplifier. A slow polarization scrambler then randomly polarizes the optical signal to yield a polarized optical signal, which is used as an input signal of the optical amplifier. The output signal of the optical amplifier is then transferred to a fast polarization scrambler, resulting in a PDG measurement signal, which is then presented to an optical signal analyzer that measures the intensity level of each channel of the PDG measurement signal. Alternately, a wavelength division multiplexing (WDM) polarization mixer is employed to mix the polarization states of WDM channels of the polarized optical signal from the slow polarization scrambler with respect to each other, yielding the input signal for the optical amplifier under test.

20 Claims, 4 Drawing Sheets

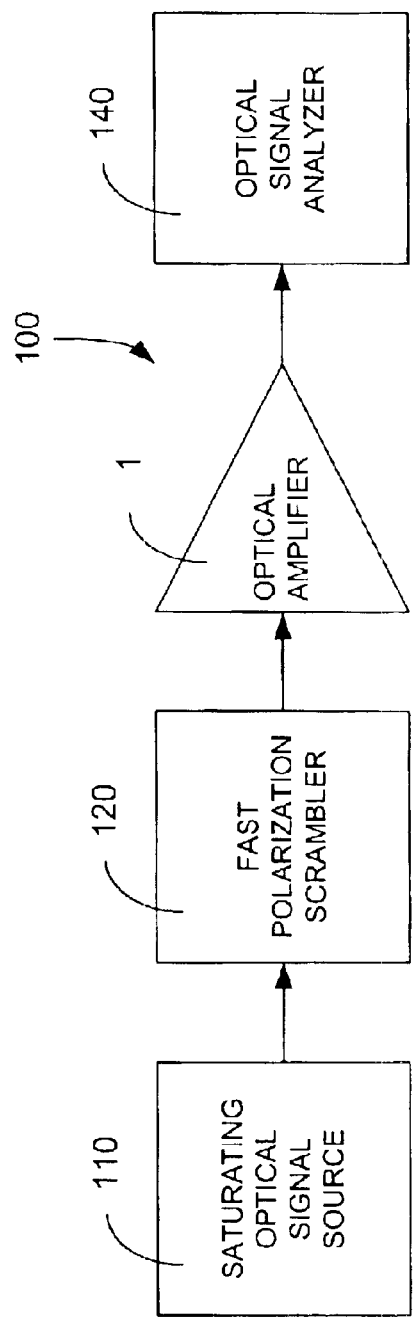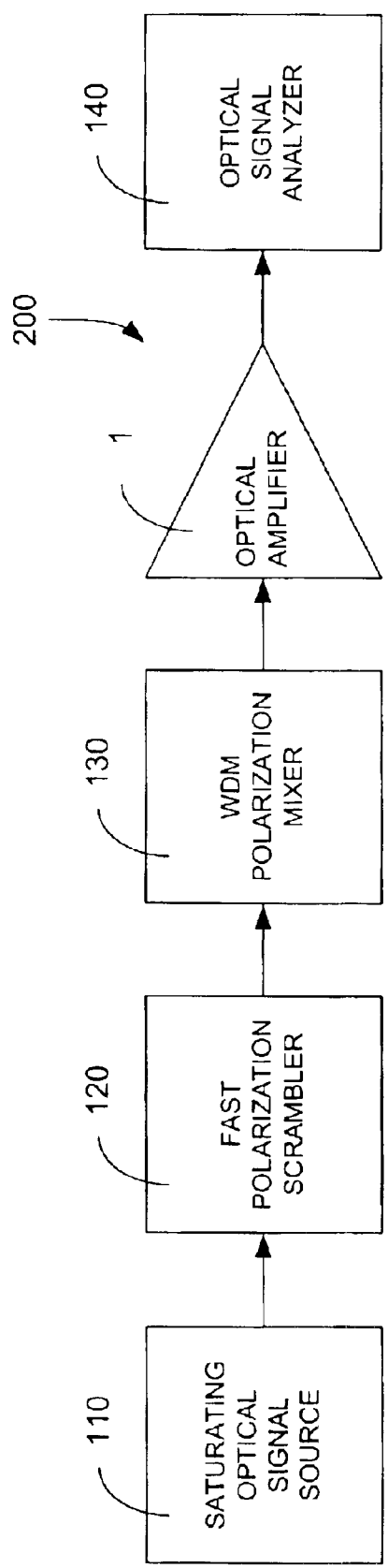

SYSTEM AND METHOD FOR MEASURING POLARIZATION DEPENDENT GAIN OF AN OPTICAL AMPLIFIER

BACKGROUND OF THE INVENTION

Optical fiber networks are playing an increasingly important role in high-speed communications networks. To handle the increasing data rates and bandwidths expected of these networks, advances in optical communication technology continue to be made at a brisk pace. One of the vital components of optical fiber networks that continues to be improved upon is the optical amplifier, which is charged with the task of initially transmitting, or later boosting, an optical signal along an optical fiber. Such optical signals may be characterized as either single-channel or multiple-channel signals. Multiple-channel signals are normally implemented via wavelength division multiplexing (WDM), whereby the wavelength spectrum of the optical signal is apportioned into multiple wavelength segments, each of which implements a separate communications channel, thereby increasing overall communications bandwidth. As optical amplifiers for these optical networks become more sophisticated, test systems used to measure the performance of the optical amplifiers necessarily must be improved in order to provide the developers and manufacturers of the amplifiers with the parametric information they require to thoroughly characterize their products.

A particularly important characteristic of an optical amplifier is its polarization dependent gain (PDG). Designers and manufacturers of optical amplifiers normally seek to minimize changes in the intensity level of the output signal of these devices when the polarization of the incoming optical signal changes state. Generally speaking, the measured PDG of an optical amplifier is its maximum output signal minus its minimum output signal over substantially all optical polarization states.

Several different methods for analyzing the intensity level of the output signal of an optical amplifier under varying input conditions currently exist. FIG. 1 shows a first optical amplifier test system 100 for testing an optical amplifier 1. A saturating optical signal source 110 generates an optical signal that is capable of saturating the input of the optical amplifier 1. The saturating optical signal source 110 may be either a single-channel or multiple-channel WDM source. At the saturation level, changes in intensity level of the output signal of the optical amplifier 1 are minimal when the intensity level of the input signal varies about the saturation level. Use of the saturating optical signal source 110 thus eliminates a potential cause of change in the output signal level when measuring the intensity level of the output signal of the optical amplifier 1. The normal operating condition of the optical amplifier assumes such a saturated mode.

The optical signal generated by the saturating optical signal source 110 is then quickly polarized in a random fashion by a fast polarization scrambler 120. The terms "fast" and "quick" refer to the fact that the polarization states of the optical signal are cycled through more quickly than the recovery/relaxation rate of the optical amplifier 1 will allow the amplifier 1 to substantially react to the changes in polarization state. In other words, while the polarization states are being changed, the intensity level of the output signal of the optical amplifier 1 remains essentially constant. Normally, the fast polarization scrambler randomly cycles through some small subset of possible polarization states well distributed throughout the possible states represented by a Poincaré sphere.

The resulting polarized signal from the fast polarization scrambler 120 is then passed as an input signal to the optical amplifier 1. The resulting output signal of the optical amplifier 1, operating in saturation, is then analyzed, typically by way of an optical signal analyzer 140, which can determine the intensity level and wavelength of the output signal. Due to the action of the fast polarization scrambler 120, the intensity level of the output signal for a single channel test (or for each WDM channel in the case of a multiple channel WDM optical signal source) is essentially constant throughout all polarization states, thus representing an average output value for the channel being tested.

For multiple channel optical amplifier tests, the intensity level of each WDM channel is often measured separately. Unfortunately, if each WDM channel exhibits the same polarization state, as is the case with the polarized signal from the fast polarization scrambler 120, the optical amplifier 1 is likely to exhibit the phenomenon of "polarization hole-burning." This phenomenon results in a lower-than-normal output signal of the optical amplifier 1 for each of the WDM channels of the optical amplifier 1. Many (but not all) amplifier designers and manufacturers require that polarization hole-burning not affect the intensity level measurement for each channel. Thus, a second optical amplifier test system 200, as shown in FIG. 2, may employ a WDM polarization mixer 130 for the polarized signal of the fast polarization scrambler 120 to mix the polarization of the WDM channels with respect to each other to avoid polarization hole-burning. Thus, the WDM polarization scrambler 130 essentially eliminates the possible effects of polarization hole-burning from the intensity level measurement of each WDM channel. The resulting signal from the WDM polarization mixer 130 is then used as the input signal for the optical amplifier 1 under test.

While such a measurement is useful, the polarization dependent gain of a channel, which requires detection of minimum and maximum output signal levels across a variety of polarization states, cannot be determined effectively in this manner due to the speed at which the fast polarization scrambler 120 cycles through the polarization states.

To address this issue, FIG. 3 shows a third optical amplifier test system 300 that employs a slow polarization scrambler 150 in place of the fast polarization scrambler 120 of FIG. 1. The slow polarization scrambler 150 rotates through polarization states at a rate at which the relaxation/recovery rate of the optical amplifier 1 allows the output signal of the optical amplifier 1 to react essentially completely to the change in the polarization state of the input signal. One such slow polarization scrambler is the Agilent Technologies 11896A Polarization controller, which utilizes a series of optical fiber loops to accomplish any possible polarization state. Typically, within the third optical amplifier test system 300, the slow polarization scrambler 150 need cover only a small number of the possible elliptical polarization states in a random fashion in order to effectively detect the minimum and maximum output signal levels of the optical amplifier 1 for each channel tested. Typically, the slow polarization scrambler 150 can cycle through the used polarization states in approximately five seconds while still providing the polarization state coverage necessary to test optical amplifier 1 sufficiently. Also, the slow polarization scrambler 150 normally employs random cycling through elliptical polarization states while avoiding pure linear or circular polarization states, which also may cause the aforementioned polarization hole-burning. As described earlier, such a phenomenon would have a detrimental effect on determining the true PDG of the optical amplifier 1.

Also, as discussed before in relation to second optical amplifier test system 200, addition of a WDM polarization mixer 130 at the output of the slow polarization scrambler 150, as shown in a fourth optical amplifier test system 400 (FIG. 4), will essentially eliminate the effects of that phenomenon from the PDG measurements of multiple WDM channels.

Unfortunately, the third and fourth optical amplifier test systems 300, 400 ordinarily introduce another type of error in the PDG measurement of optical amplifier 1. This error is in the form of a polarization dependent loss (PDL) of the portion of the optical path between the output of the optical amplifier 1 and the optical spectrum analyzer 140. Many newer optical amplifiers operate as waveguides that provide a separate optical path for each WDM channel. This amplifier architecture causes the PDG of each channel of an optical amplifier 1 to potentially vary greatly from channel to channel. Each separate channel of such an amplifier may be required to exhibit a subjectively acceptable PDG, which is normally in the range of 0.3 dB or less. However, with a normal prior art test system PDL of about 0.12 dB, the PDG measurement of some channels of the optical amplifier, as measured by the optical signal analyzer 140, may be skewed significantly either up or down, possibly resulting in an unacceptably inaccurate determination of PDG for one or more channels of the optical amplifier 1.

Therefore, from the foregoing, a new optical amplifier test system and method that greatly reduces the polarization dependent loss of the test system, thus reducing the amount of error in the polarization dependent gain measurement of an optical amplifier, would be advantageous.

SUMMARY OF THE INVENTION

Embodiments of the present invention, to be discussed in detail below, represent a system and method that effectively measures the polarization dependent gain of an optical amplifier without significantly introducing error into that measurement. As has been done in the past, a saturating optical signal source generates an optical signal capable of saturating the optical amplifier. That optical signal is then randomly polarized by a slow polarization scrambler, resulting in a polarized optical signal that is used as an input signal for the optical amplifier under test. Unlike previous test systems, however, the output signal of the optical amplifier is then transferred to a fast polarization scrambler, resulting in a PDG measurement signal, which is then presented to an optical signal analyzer that measures that signal's intensity level for each channel of the signal.

Optionally, in the case that the saturating optical signal source is a WDM source, a WDM polarization mixer is also employed to mix the polarization state of each WDM channel of the polarized optical signal from the slow polarization scrambler, with the resulting signal being used as input for the optical amplifier under test.

Typically, use of the fast polarization scrambler greatly reduces the effect of the polarization dependent loss normally associated with such a test system on the polarization gain measurement of the optical amplifier. This reduction in PDL occurs because the fast polarization scrambler effectively averages the variations in the output signal of the optical amplifier caused by the portion of the test system that normally contributes a significant PDL to the amplifier PDG measurement.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 1 is a block diagram of a first optical amplifier test system according to the prior art that measures the average output signal level of an optical amplifier over multiple polarization states.

FIG. 2 is a block diagram of a second optical amplifier test system according to the prior art that measures the average output signal level of an optical amplifier over multiple polarization states while reducing polarization hole-burning.

DETAILED DESCRIPTION OF THE PREFERRED EMBODIMENTS

Figure 4:
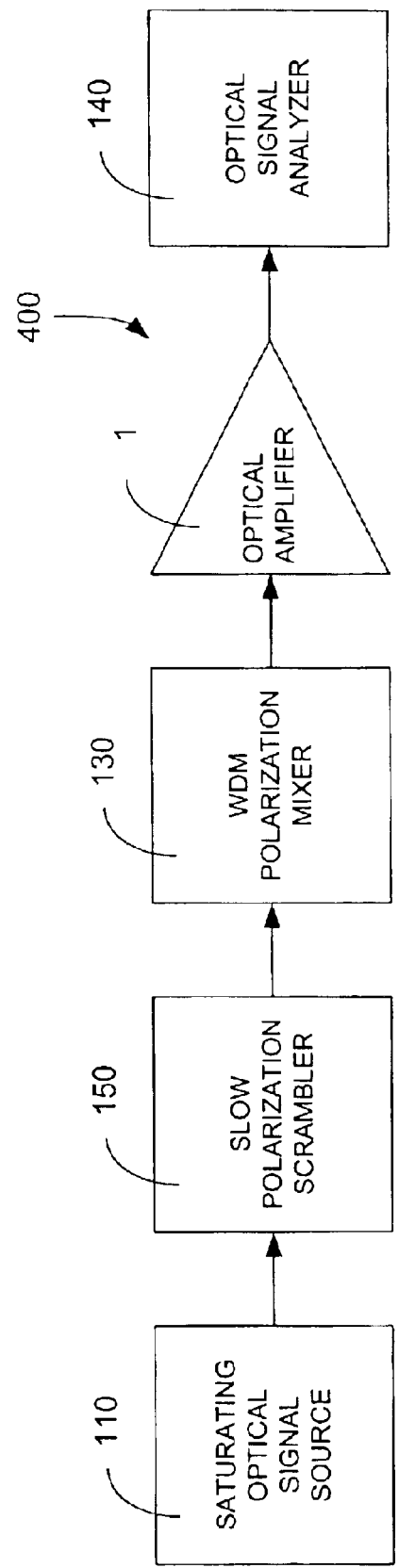
FIG. 4 is a block diagram of a fourth optical amplifier test system according to the prior art that measures the polarization dependent gain of an optical amplifier while reducing polarization hole-burning.
Figure 5:
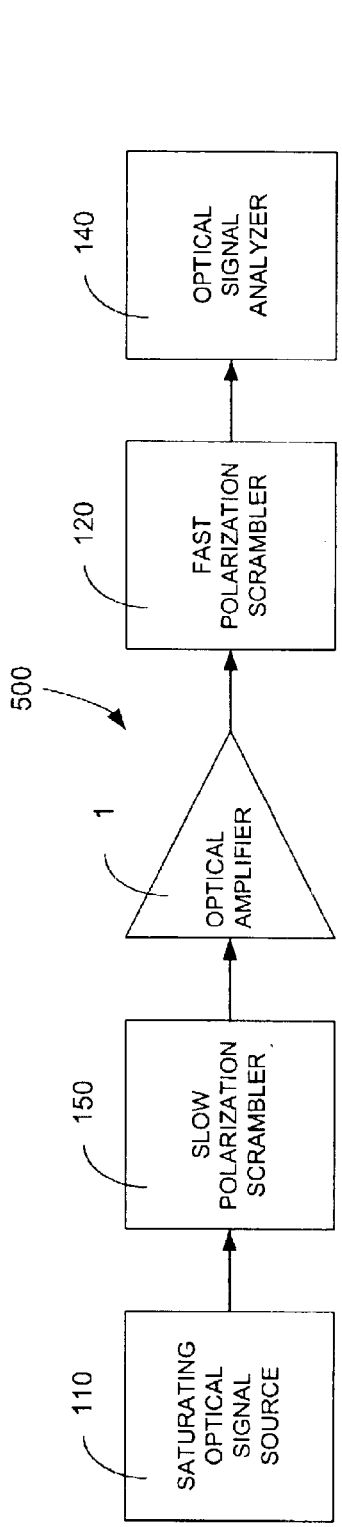
FIG. 5 is a block diagram of a first improved optical amplifier test system according to an embodiment of the invention that measures the polarization dependent gain of the optical amplifier.
Figure 6:
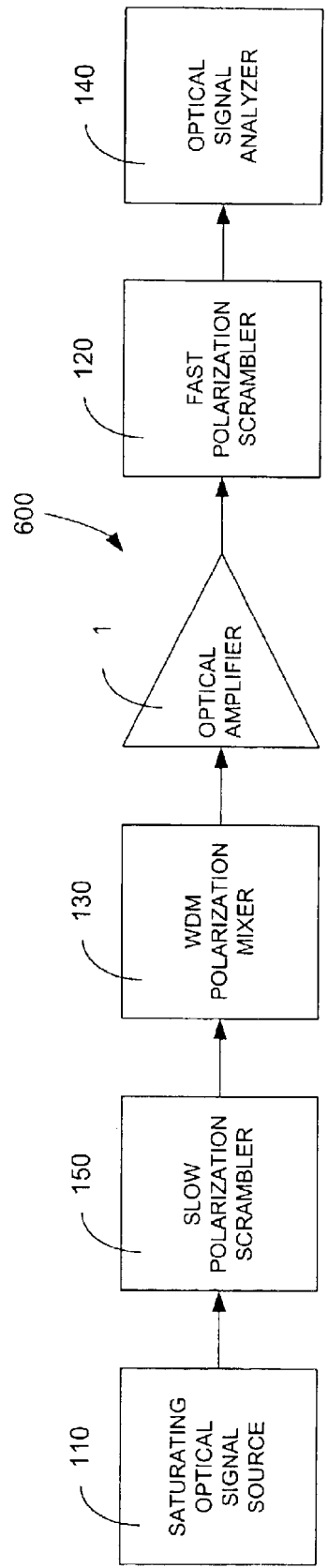
FIG. 6 is a block diagram of a second improved optical amplifier test system according to an embodiment of the invention that measures the polarization dependent gain of the optical amplifier while reducing polarization hole-burning.

Embodiments of the invention, a first and second improved optical amplifier test systems 500 and 600, are shown in FIG. 5 and FIG. 6. These improved test systems 500, 600 utilize essentially the same components as the third and fourth optical amplifier test systems 300, 400 of FIG. 3 and FIG. 4, but with at least one major enhancement, to be discussed below. First, a saturating signal source 110 generates an optical signal that will saturate the optical amplifier 1. Saturation, whereby the intensity level of the input signal is high enough so that small changes in the input signal of the optical amplifier 1 result in essentially no change in the intensity level of the output signal, is the normal operating condition of the optical amplifier. Dependent upon whether single-channel or multiple-channel tests are desired, the saturating signal source 110 may be either a single channel or WDM source.

Figure 3:
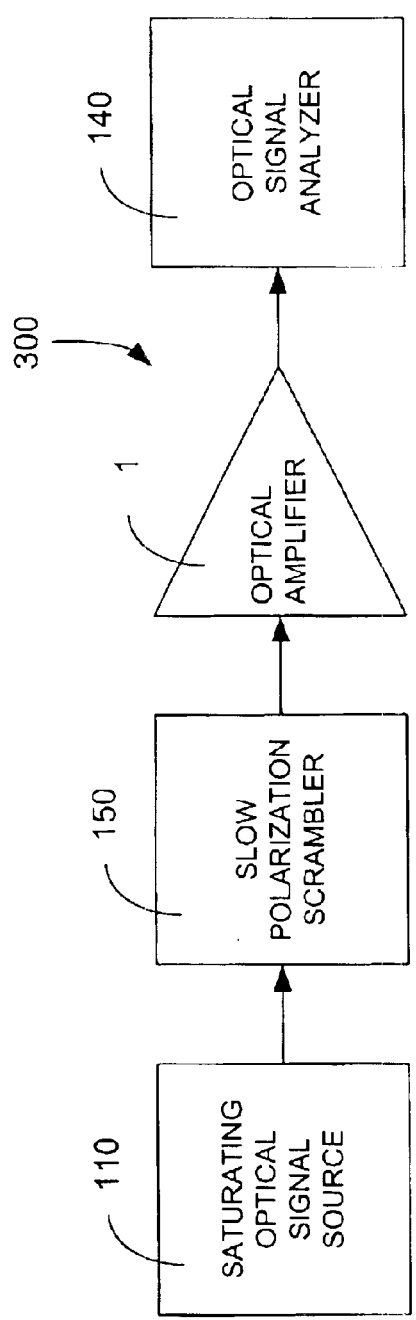
FIG. 3 is a block diagram of a third optical amplifier test system according to the prior art that measures the polarization dependent gain of an optical amplifier.

As previously discussed in FIG. 3 and FIG. 4, a slow polarization scrambler 150 then randomly cycles the optical signal from the saturating signal source 110 through various polarization states slowly enough in relation to the relaxation/recovery rate of the optical amplifier 1 that the intensity level of the output signal of the optical amplifier 1 essentially fully reacts to the change in the polarization state of the input signal. As also mentioned above, the slow polarization scrambler 150 need only cover a small number of the possible elliptical polarization states in a random fashion in order to effectively detect the minimum and maximum output signal levels of the optical amplifier 1 for each channel tested. Cycling through these states can take as little as five seconds while still providing the polarization state coverage necessary to test optical amplifier 1 effectively. Also, the slow polarization scrambler 150 may employ random cycling through elliptical polarization states while avoiding the pure linear or circular polarization states that may cause polarization hole-burning.

Optionally, in the case of a multiple-channel WDM test, the resulting polarized signal from the slow polarization scrambler 150 is then fed to a WDM polarization mixer 130, shown in FIG. 6, that mixes the polarization states of each of the channels that the polarized signal is utilizing with respect to each other. As discussed above, the WDM polarization mixer 130 reduces the presence of polarization hole-burning, which has a deleterious effect on the PDG measurement of an optical amplifier for multiple WDM channels. The resulting signal is then utilized as the input signal for the optical amplifier 1. If polarization hole-burning is not a concern, such as with single channel testing, the WDM polarization mixer may be omitted, as indicated in FIG. 5, with the polarized signal from the slow polarization scrambler 150 being utilized without modification as the input signal of the optical amplifier 1 under test.

Unlike the third and fourth optical amplifier test systems 300, 400 (from FIG. 3 and FIG. 4), the output signal of the optical amplifier 1 is passed to a fast polarization scrambler 120, shown in both FIG. 5 and FIG. 6, which generates a PDG measurement signal which is presented to an optical signal analyzer 140 for PDG measurement of each channel of that signal. The fast polarization scrambler 120 randomly cycles the output signal through polarization states fast enough that the optical signal analyzer 140 will not react to changes in intensity level of the PDG measurement signal. These intensity level changes are normally due to the polarization dependent loss (PDL) induced by the portion of the optical path between the optical amplifier 1 under test and the optical signal analyzer 140. As a result, unlike the third and fourth optical amplifier test systems 300, 400, the signal being measured by the optical signal analyzer 140 in the improved systems 500, 600 will not vary substantially in signal intensity over time depending on the polarization state of that signal. Therefore, the PDL contribution to the error in the measured PDG by that portion of the optical path between the optical amplifier 1 and the optical signal analyzer 140 is greatly reduced.

Generally speaking, the shorter the optical path between the output of the optical amplifier 1 under test and the input to the fast polarization scrambler 120, the more substantial the reduction in the PDL contributed by the improved test system 300. Thus, the optimum placement for the fast polarization scrambler 120 of improved test system 300 will likely be directly at the output of the optical amplifier 1 under test, thereby minimizing the physical distance between the fast polarization scrambler 120 and the optical amplifier 1. In preliminary testing, a fast polarization scrambler 120 connected directly to the output of the optical amplifier 1 under test reduced the PDL contributed by the latter portion of the test system optical path from about +/−0.12 dB (typically) to approximately +/−0.02 dB. This difference represents a drastic reduction in the amount of error being induced by the test system into the optical amplifier PDG measurement.

Figure 7:
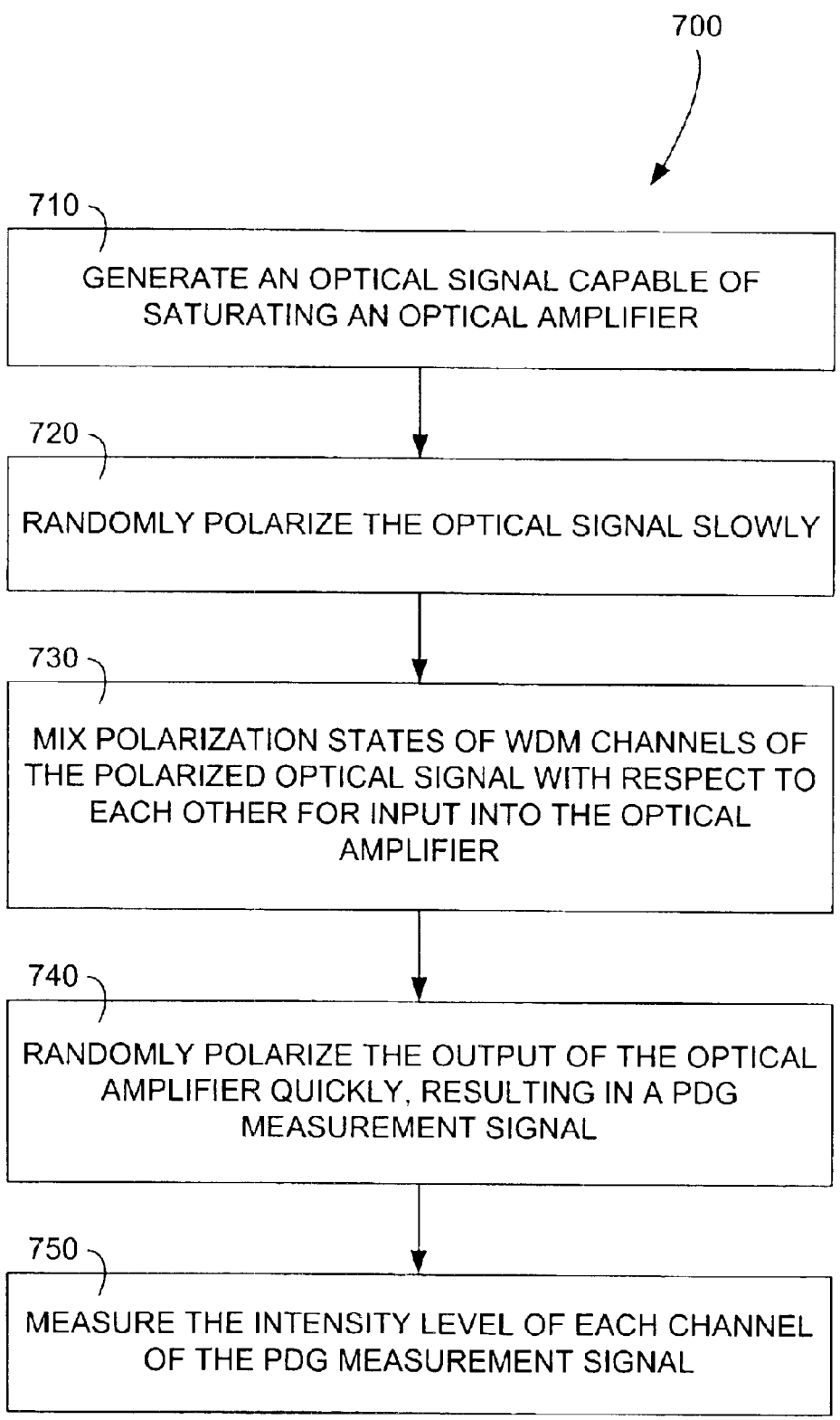
FIG. 7 is a flow chart of a method of measuring the polarization dependent gain of an optical amplifier according to an embodiment of the invention.

Embodiments of the invention can also take the form of an improved method 700 of measuring the polarization dependent gain of an optical amplifier, as shown in FIG. 7. First, an optical signal capable of saturating an optical amplifier under test is generated (step 710). Next, the optical signal is randomly polarized slowly, as indicated in the discussion above (step 720), resulting in a polarized optical signal. Optionally, primarily for multiple-channel testing purposes, the polarization states of each WDM channel of the polarized optical signal are then mixed with respect to each other, as indicated above, for use as an input signal for the optical amplifier (step 730). Otherwise, the polarized optical signal from the slow random polarizing step is used directly as the input signal of the optical amplifier. The resulting output signal of the optical amplifier under test is then randomly polarized quickly (step 740), in accordance with the above discussion, with the intensity level of each channel of the resulting PDG measurement signal then being measured (step 750).

From the foregoing, the embodiments of the invention discussed above have been shown to provide an improved polarization dependent gain measurement for optical amplifiers over what has been available previously. Additionally, other specific systems and methods embodying the invention are also possible. Therefore, the present invention is not to be limited to the specific forms so described and illustrated; the invention is limited only by the claims.

What is claimed is:

1. A test system for determining the polarization dependent gain (PDG) of an optical amplifier having an input signal and an output signal, comprising:

an optical signal source configured to generate an optical signal capable of saturating the optical amplifier, the optical signal having at least one channel;

a slow polarization scrambler configured to randomly polarize the optical signal slowly, resulting in a polarized optical signal that is the input signal of the optical amplifier;

a fast polarization scrambler configured to randomly polarize the output signal of the optical amplifier quickly, resulting in a PDG measurement signal; and an optical signal analyzer configured to measure the intensity level of the at least one channel of the PDG measurement signal.

2. The test system of claim 1, wherein the optical signal source is a single-channel optical signal source.

3. The test system of claim 1, wherein the optical signal source is a multiple-channel wavelength division multiplexing (WDM) optical signal source.

4. The test system of claim 3, further comprising:

a WDM polarization mixer configured to mix polarization states of WDM channels of the polarized optical signal with respect to each other, resulting in the input signal of the optical amplifier.

5. The test system of claim 1, wherein the slow polarization scrambler rotates through all employed polarization states for each of the at least one channel in approximately five seconds.

6. The test system of claim 1, wherein the slow polarization scrambler employs elliptical polarization states only.

7. The test system of claim 1, wherein the physical distance between the optical amplifier and the fast polarization scrambler is minimized.

8. A test system for determining the polarization dependent gain (PDG) of an optical amplifier having an input signal and an output signal, comprising:

means for generating an optical signal capable of saturating the optical amplifier, the optical signal having at least one channel;

means for randomly polarizing the optical signal slowly, resulting in a polarized optical signal that is the input signal of the optical amplifier;

means for randomly polarizing the output signal of the optical amplifier quickly, resulting in a PDG measurement signal; and means for measuring the intensity level of the at least one channel of the PDG measurement signal.

9. The test system of claim 8, wherein the optical signal generating means generates a single-channel optical signal.

10. The test system of claim 8, wherein the optical signal generating means generates a multiple-channel wavelength division multiplexing (WDM) optical signal.

11. The test system of claim 10, further comprising:
means for mixing polarization states of WDM channels of the polarized optical signal with respect to each other, resulting in the input signal for the optical amplifier.

12. The test system of claim 8, wherein the slowly randomly polarizing means rotates through all employed polarization states for each of the at least one channel in approximately five seconds.

13. The test system of claim 8, wherein the slowly randomly polarizing means employs elliptical polarization states only.

14. The test system of claim 8, wherein the physical distance between the optical amplifier and the quickly randomly polarizing means is minimized.

15. A method of determining the polarization dependent gain (PDG) of an optical amplifier having an input signal and an output signal, comprising:
generating an optical signal capable of saturating the optical amplifier, the optical signal having at least one channel;
randomly polarizing the optical signal slowly, resulting in a polarized optical signal that is the input signal of the optical amplifier;
randomly polarizing the output signal of the optical amplifier quickly, resulting in a PDG measurement signal; and
measuring the intensity level of the at least one channel of the PDG measurement signal.

16. The method of claim 15, wherein the optical signal generating step generates a single-channel optical signal.

17. The method of claim 15, wherein the optical signal generating step generates a multiple-channel wavelength division multiplexing (WDM) optical signal.

18. The method of claim 17, further comprising:
mixing polarization states of WDM channels of the polarized optical signal with respect to each other, resulting in the input signal for the optical amplifier.

19. The method of claim 15, wherein the slowly randomly polarizing step rotates through all employed polarization states for each of the at least one channel in approximately five seconds.

20. The method of claim 15, wherein the slowly randomly polarizing step employs elliptical polarization states only.

* * * * *